United States Patent
Park et al.

(10) Patent No.: US 12,405,858 B2
(45) Date of Patent: Sep. 2, 2025

(54) ELECTRONIC DEVICE FOR SUPPORTING DATA BACKUP, AND OPERATION METHOD THEREOF

(71) Applicant: Samsung Electronics Co., Ltd., Suwon-si (KR)

(72) Inventors: Sanghyun Park, Suwon-si (KR); Heangsu Kim, Suwon-si (KR); Myungkeun Oh, Suwon-si (KR); Jieun Jung, Suwon-si (KR); Yeunwook Lim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/351,062

(22) Filed: Jul. 12, 2023

(65) Prior Publication Data

US 2023/0359530 A1    Nov. 9, 2023

Related U.S. Application Data

(63) Continuation of application No. PCT/KR2021/018753, filed on Dec. 10, 2021.

(30) Foreign Application Priority Data

Jan. 12, 2021  (KR) .................. 10-2021-0004038

(51) Int. Cl.
*G06F 12/00* (2006.01)
*G06F 11/14* (2006.01)
(Continued)

(52) U.S. Cl.
CPC ...... *G06F 11/1458* (2013.01); *G06F 11/1451* (2013.01); *G06F 21/31* (2013.01); *G06F 21/45* (2013.01)

(58) Field of Classification Search
CPC .. G06F 11/1458; G06F 11/1451; G06F 21/31; G06F 21/45; G06F 11/14;
(Continued)

(56) References Cited

U.S. PATENT DOCUMENTS

| 7,062,621 B2 | 6/2006 | Mizuno et al. |
| 7,085,904 B2 | 8/2006 | Mizuno et al. |

(Continued)

FOREIGN PATENT DOCUMENTS

| JP | 06-168079 A | 6/1994 |
| JP | 2005-122611 A | 5/2005 |

(Continued)

OTHER PUBLICATIONS

International Search Report dated Mar. 24, 2022, issued in International Patent Application No. PCT/KR2021/0187 53.

*Primary Examiner* — Arvind Talukdar
(74) *Attorney, Agent, or Firm* — Jefferson IP Law, LLP (57) ABSTRACT

An electronic device is provided. The electronic device includes a processor, a communication circuit that establishes a connection between external storage and a device, and a memory operatively connected to the processor and storing instructions. When executed by the processor, the instructions may cause the electronic device to execute an application that provides a backup function, identify first data in response to a first user input to the application, identify a backup history stored in the memory, identify a data type of the first data in response to a fact that the at least one backup history is present, generate all of the first data or a part of the first data, which is generated after a point in time according to a latest backup history, as backup data based on the data type, and store the generated backup data in the external storage.

19 Claims, 7 Drawing Sheets

(51) Int. Cl.
*G06F 21/31* (2013.01)
*G06F 21/45* (2013.01)

(58) Field of Classification Search
CPC ............. G06F 11/1448; G06F 11/1456; G06F 11/1461; G06F 11/1464; G06F 11/1469
See application file for complete search history.

(56) References Cited

U.S. PATENT DOCUMENTS

| | | |
|---|---|---|
| 7,756,833 B2 | 7/2010 | Ingen et al. |
| 8,031,522 B2 | 10/2011 | Jang et al. |
| 8,223,544 B2 | 7/2012 | Jang et al. |
| 8,533,189 B2 | 9/2013 | Ingen et al. |
| 8,805,953 B2 | 8/2014 | Murphy et al. |
| 9,317,369 B2 | 4/2016 | Freedman et al. |
| 9,411,687 B2 | 8/2016 | Freedman et al. |
| 9,894,510 B1 | 2/2018 | Kortunov et al. |
| 9,904,597 B2 | 2/2018 | Freedman et al. |
| 10,095,715 B2 | 10/2018 | Yin |
| 10,455,015 B2 | 10/2019 | Procopio et al. |
| 11,178,224 B2 | 11/2021 | Procopio et al. |
| 11,245,758 B2 | 2/2022 | Procopio et al. |
| 2002/0107886 A1* | 8/2002 | Gentner ................ G06F 40/166 715/255 |
| 2005/0108484 A1 | 5/2005 | Park |
| 2010/0250939 A1* | 9/2010 | Adams .................... H04L 63/10 713/168 |
| 2011/0016089 A1* | 1/2011 | Freedman ........... G06F 11/1469 711/E12.001 |
| 2013/0311597 A1 | 11/2013 | Arrouye et al. |
| 2014/0188808 A1* | 7/2014 | Wolf ....................... G06F 16/21 707/654 |
| 2018/0267862 A1 | 9/2018 | Aseev et al. |
| 2018/0341556 A1* | 11/2018 | Lin ..................... G06F 11/1464 |
| 2020/0279048 A1 | 9/2020 | Jang |

FOREIGN PATENT DOCUMENTS

| | | |
|---|---|---|
| JP | 2006-211051 A | 8/2006 |
| JP | 2019-159477 A2 | 9/2019 |
| KR | 10-0359423 B1 | 11/2002 |
| KR | 10-2007-0023129 A | 2/2007 |
| KR | 10-0889781 B1 | 3/2009 |
| KR | 10-1153023 B1 | 6/2012 |
| KR | 10-1374533 B1 | 3/2014 |
| KR | 10-2017-0088160 A | 8/2017 |

\* cited by examiner

ELECTRONIC DEVICE FOR SUPPORTING DATA BACKUP, AND OPERATION METHOD THEREOF

CROSS-REFERENCE TO RELATED APPLICATION(S)

This application is a continuation application, claiming priority under § 365(c), of an International application No. PCT/KR2021/018753, filed on Dec. 10, 2021, which is based on and claims the benefit of a Korean patent application number 10-2021-0004038, filed on Jan. 12, 2021, in the Korean Intellectual Property Office, the disclosure of which is incorporated by reference herein in its entirety.

BACKGROUND

1. Field

The disclosure relates to an electronic device supporting a data backup and an operating method thereof.

2. Description of Related Art

A user of an electronic device may back up data, which is stored in the electronic device, in external storage in preparation for unexpected data loss or unintentional data deletion. When the user needs data thus backed up, the electronic device may restore the backup data.

The above information is presented as background information only to assist with an understanding of the disclosure. No determination has been made, and no assertion is made, as to whether any of the above might be applicable as prior art with regard to the disclosure.

SUMMARY

An electronic device may perform a plurality of backups at different points in time. In this case, backup data at a last point in time may be overwritten with backup data at a previous point in time.

Moreover, a plurality of electronic devices may store backup data in one external memory. In this case, backup data generated by one electronic device may be overwritten with backup data previously stored by another electronic device.

Aspects of the disclosure are to address at least the above-mentioned problems and/or disadvantages and to provide at least the advantages described below. Accordingly, an aspect of the disclosure is to provide an electronic device supporting a data backup and an operating method thereof.

Additional aspects will be set forth in part in the description which follows and, in part, will be apparent from the description, or may be learned by practice of the presented embodiments.

In accordance with an aspect of the disclosure, an electronic device is provided. The electronic device includes at least one processor, a communication circuit that establishes a connection between external storage and a device, and a memory operatively connected to the at least one processor and storing instructions. When executed by the at least one processor, the instructions may cause the electronic device to execute an application that provides a backup function, to identify first data in response to a first user input to the application, to identify a backup history stored in the memory, to identify a data type of the first data in response to a fact that the at least one backup history is present, to generate all of the first data or a part of the first data, which is generated after a point in time according to a latest backup history, as backup data based on the data type, and to store the generated backup data in the external storage.

In accordance with another aspect of the disclosure, a method of operating an electronic device is provided. The method includes executing an application that provides a backup function, identifying first data in response to a first user input to the application, identifying a backup history, identifying a data type of the first data in response to a fact that the at least one backup history is present, generating all of the first data or a part of the first data, which is generated after a point in time according to a latest backup history, as backup data based on the data type, and storing the generated backup data in external storage.

According to embodiments disclosed in the specification, an electronic device may efficiently manage the storage space of external storage by providing a differential backup according to various points in time.

According to embodiments disclosed in the specification, an electronic device may enhance the security of backup and restoration functions by generating encrypted backup data based on a user account.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
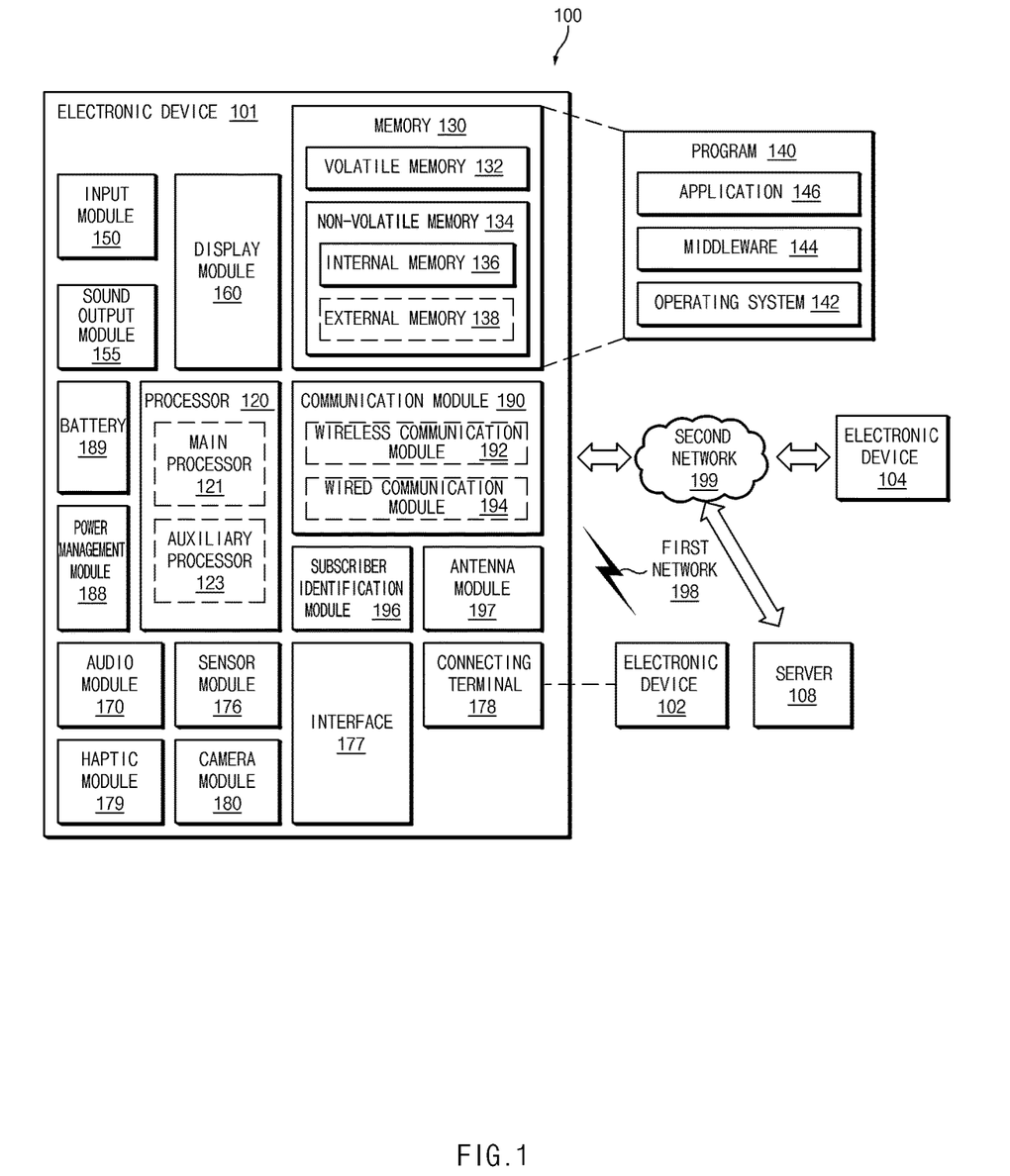
FIG. 1 is a block diagram of an electronic device in a network environment according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an external electronic device 102 via a first network 198 (e.g., a short-range wireless communication network), or at least one of an external electronic device 104 or a server 108 via a second network 199 (e.g., a long-range wireless communication network). According to an embodiment of the disclosure, the electronic device 101 may communicate with the external electronic device 104 via the server 108. According to an embodiment of the disclosure, the electronic device 101 may include a processor 120, a memory 130, an input module 150, a sound output module 155, the display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments of the disclosure, at least one of the components (e.g., the connecting terminal 178) may be omitted from the electronic device 101, or one or more other components may be added in the electronic device 101. In some embodiments of the disclosure, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment of the disclosure, as at least part of the data processing or computation, the processor 120 may store a command or data received from another component (e.g., the sensor module 176 or the communication module 190) in a volatile memory 132, process the command or the data stored in the volatile memory 132, and store resulting data in a non-volatile memory 134. According to an embodiment of the disclosure, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., a sleep) state, or together with the main processor 121 while the main processor 121 is in an active state (e.g., executing an application). According to an embodiment of the disclosure, the auxiliary processor 123 (e.g., an image signal processor or a communication processor) may be implemented as part of another component (e.g., the camera module 180 or the communication module 190) functionally related to the auxiliary processor 123. According to an embodiment of the disclosure, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thererto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment of the disclosure, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment of the disclosure, the display module 160 may include a touch sensor adapted to detect a touch, or a pressure sensor adapted to measure the intensity of force incurred by the touch.

The audio module 170 may convert a sound into an electrical signal and vice versa. According to an embodiment of the disclosure, the audio module 170 may obtain the sound via the input module 150, or output the sound via the sound output module 155 or a headphone of an external electronic device (e.g., the external electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment of the disclosure, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the external electronic device 102) directly (e.g., wiredly) or wirelessly. According to an embodiment of the disclosure, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the external electronic device 102). According to an embodiment of the disclosure, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment of the disclosure, the haptic module 179 may include, for example, a motor, a piezoelectric element of the disclosure, or an electric stimulator.

The camera module 180 may capture a still image or moving images. According to an embodiment of the disclosure, the camera module 180 may include one or more lenses, image sensors, image signal processors, or flashes.

The power management module 188 may manage power supplied to the electronic device 101. According to one embodiment of the disclosure, the power management module 188 may be implemented as at least part of, for example, a power management integrated circuit (PMIC).

The battery 189 may supply power to at least one component of the electronic device 101. According to an embodiment of the disclosure, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the external electronic device 102, the external electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment of the disclosure, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5th generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4th generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the external electronic device 104), or a network system (e.g., the second network 199). According to an embodiment of the disclosure, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment of the disclosure, the antenna module 197 may include an antenna including a radiating element including a conductive material or a conductive pattern formed in or on a substrate (e.g., a printed circuit board (PCB)). According to an embodiment of the disclosure, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment of the disclosure, another component (e.g., a radio frequency integrated circuit (RFIC)) other than the radiating element may be additionally formed as part of the antenna module 197.

According to various embodiments of the disclosure, the antenna module 197 may form a mmWave antenna module. According to an embodiment of the disclosure, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment of the disclosure, commands or data may be transmitted or received between the electronic device 101 and the external electronic device 104 via the server 108 coupled with the second network 199. Each of the external electronic devices 102 or 104 may be a device of a same type as, or a different type, from the electronic device 101. According to an embodiment of the disclosure, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment of the disclosure, the external electronic device 104 may include an internet-of-things (IoT) device. The server 108 may be an intelligent server using machine learning and/or a neural network. According to an embodiment of the disclosure, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments of the disclosure may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment of the disclosure, the module may be implemented in a form of an application-specific integrated circuit (ASIC).

Various embodiments as set forth herein may be implemented as software (e.g., the program 140) including one or more instructions that are stored in a storage medium (e.g., an internal memory 136 or an external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment of the disclosure, a method according to various embodiments of the disclosure may be included and provided in a computer program product. The computer program product may be traded as a product between a seller and a buyer. The computer program product may be distributed in the form of a machine-readable storage medium (e.g., a compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as a memory of the manufacturer's server, a server of the application store, or a relay server.

According to various embodiments of the disclosure, each component (e.g., a module or a program) of the above-described components may include a single entity or multiple entities, and some of the multiple entities may be separately disposed in different components. According to various embodiments of the disclosure, one or more of the above-described components may be omitted, or one or more other components may be added. Alternatively or additionally, a plurality of components (e.g., modules or programs) may be integrated into a single component. In such a case, according to various embodiments of the disclosure, the integrated component may still perform one or more functions of each of the plurality of components in the same or similar manner as they are performed by a corresponding one of the plurality of components before the integration. According to various embodiments of the disclosure, operations performed by the module, the program, or another component may be carried out sequentially, in parallel, repeatedly, or heuristically, or one or more of the operations may be executed in a different order or omitted, or one or more other operations may be added.

Figure 2:
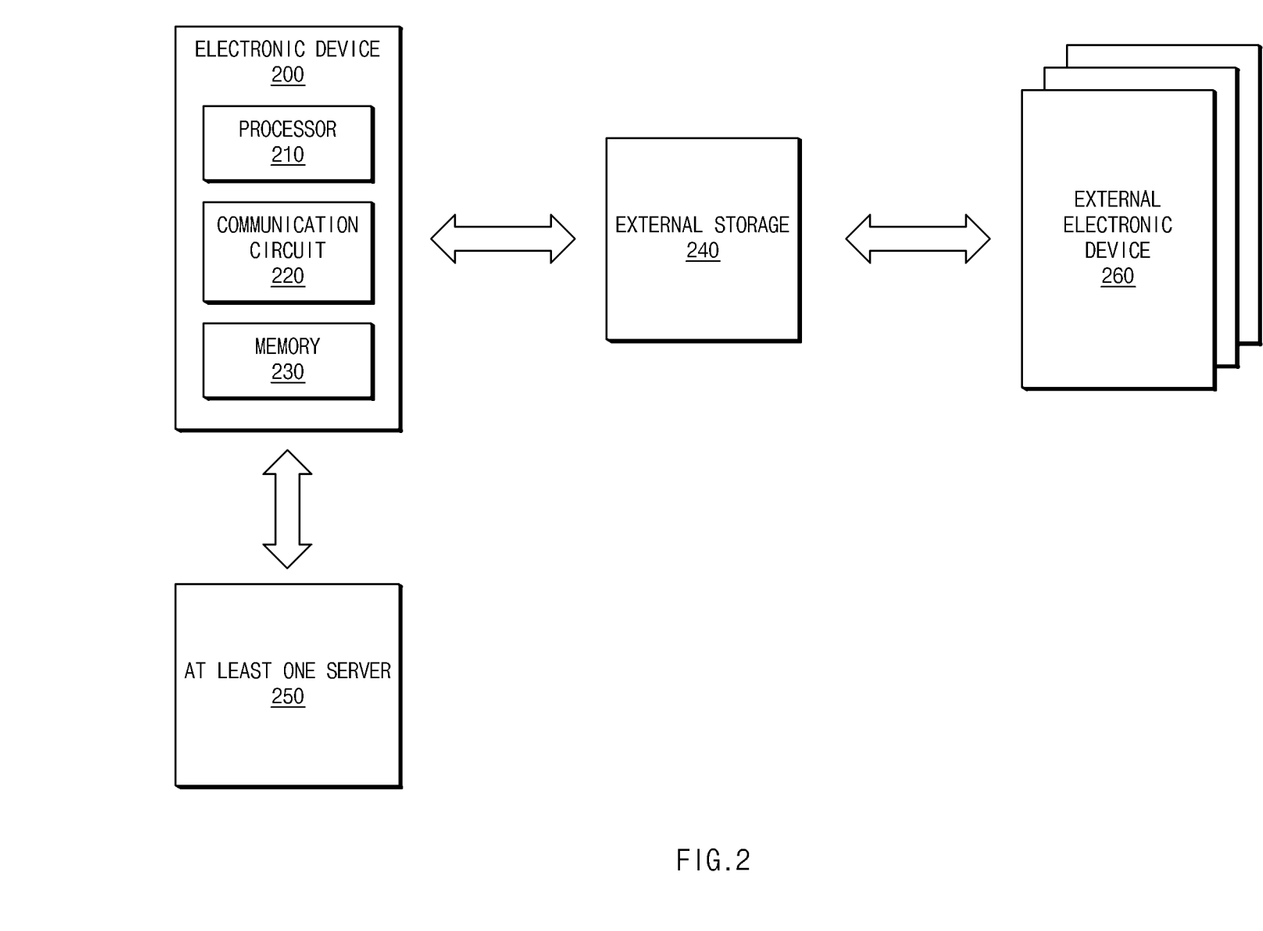
FIG. 2 illustrates a configuration of an electronic device according to an embodiment of the disclosure.

FIG. 2 illustrates a configuration of an electronic device according to an embodiment of the disclosure.

Referring to FIG. 2, according to an embodiment of the disclosure, an electronic device 200 (e.g., the electronic device 101 of FIG. 1) may include a processor 210, a communication circuit 220, and/or a memory 230.

The electronic device 200 may include at least part of components of the electronic device 101 of FIG. 1. For example, the electronic device 200 may further include the battery 189 of FIG. 1.

According to an embodiment of the disclosure, the processor 210, the communication circuit 220, or the memory 230 may correspond to the processor 120, the communication module 190, or the memory 130 of FIG. 1, respectively.

According to an embodiment of the disclosure, the processor 210 may establish a connection between external storage 240 (e.g., the external electronic device 102 or the external electronic device 104 in FIG. 1) and a device by using the communication circuit 220. A connection between devices provided by the communication circuit 220 may be wired communication or wireless communication. For example, the external storage 240 may be memory included in at least one server 250 (e.g., the server 108 of FIG. 1). For another example, the external storage 240 may include magnetic storage (e.g., an external hard disk drive) and/or a flash memory device (e.g., a memory card, a memory stick, or a universal serial bus (USB) drive). According to an embodiment of the disclosure, the processor 210 may establish a connection between the external storage 240 and a device through a USB interface (e.g., the interface 177 in FIG. 1).

According to an embodiment of the disclosure, the processor 210 may execute an application (e.g., the application 146 of FIG. 1) providing a backup function.

The processor 210 may generate backup data based on a user input for the application. According to an embodiment of the disclosure, the processor 210 may generate backup data based on a backup method (e.g., a full backup or a differential backup).

According to an embodiment of the disclosure, the differential backup method may be a method of generating some data, which is generated after a point in time according to the latest backup history, from among data identified based on a user input as backup data. The processor 210 may reduce the amount of redundant data between pieces of backup data through the differential backup. The full backup method may be a method of generating all of the data identified based on a user input as backup data.

In an embodiment of the disclosure, a backup method may be determined based on backup history information stored in the external storage 240. In an embodiment of the disclosure, the backup method may be determined based on a data type of data to be backed up. In an embodiment of the disclosure, the backup method may be determined based on the size of data to be backed up. In an embodiment of the disclosure, the data to be backed up may be identified by a user input.

According to an embodiment of the disclosure, the data type may include a first data type and a second data type. The first data type may include at least one of a photo, music, a video, a document, a voice record, a lyric, a certificate, or a playlist. According to an embodiment of the disclosure, the first data type may be stored in a data format (e.g., a file) having a specified extension name. For example, the photo may be stored in a jpg or png file; the music may be stored in an mp3 file; and, the document may be stored in a doc or ppt file. According to an embodiment of the disclosure, the second data type may include at least one of a contact, a calendar, a text, a memo, an android application package (APK), a homescreen setting (e.g., a layout, a wallpaper, or a setting value), a Wi-Fi setting, a Bluetooth setting, a keyboard setting, an accessibility setting, a font setting, a camera setting, an always on display (AOD) setting, an edge panel setting, and a notification setting. According to an embodiment of the disclosure, the second data type may be stored in a personal information management system (PIMS) data format.

The processor 210 may store the generated backup data in the external storage 240 through the connection between devices.

According to an embodiment of the disclosure, the processor 210 may encrypt backup data based on a user account. According to an embodiment of the disclosure, the processor 210 may make a request for user authentication to the at least one server 250 (e.g., the server 108 of FIG. 1) in response to a user input. When the at least one server 250 succeeds in the user authentication, the processor 210 may receive an encryption key from the at least one server 250. According to an embodiment of the disclosure, the encryption key may be understood as an account key based on a user account. The processor 210 may encrypt the generated backup data based on the encryption key. The processor 210 may store the encrypted backup data in the external storage 240.

According to an embodiment of the disclosure, the processor 210 may perform data restoration by using the backup data stored in the external storage 240. According to an embodiment of the disclosure, the external storage 240 may store pieces of backup data generated by the electronic device 200 or at least one external electronic device 260. The pieces of backup data may be identified based on a user account. For example, the pieces of backup data may include user account information linked to an electronic device (e.g., the electronic device 200 or the at least one external electronic device 260) that has generated corresponding backup data. Alternatively, the pieces of backup data may be encrypted based on a user account linked to an electronic device that has generated the corresponding backup data. The processor 210 may perform data restoration by using only backup data generated based on the same user account as a user account linked to the electronic device 200, from among the pieces of backup data stored in the external storage 240.

According to an embodiment of the disclosure, the processor 210 may perform data restoration by using at least one backup data stored in the external storage 240. The at least one backup data may be understood as backup data generated based on the same user account as a user account linked to the electronic device 200. The processor 210 may select at least one backup data to be used for data restoration based on a user input to an application. For example, when pieces of backup data generated at different time points are stored in the external storage 240, the processor 210 may perform data restoration by using at least part of the pieces of backup data based on a user input.

According to an embodiment of the disclosure, the processor 210 may perform data restoration based on a user account. According to an embodiment of the disclosure, when performing the data restoration, the processor 210 may make a request for user authentication to the at least one server 250 in response to a user input. When the at least one server 250 succeeds in the user authentication, the processor 210 may receive a decryption key from the at least one server 250. The decryption key may be understood as an account key based on a user account. In this case, the encryption key and decryption key may be symmetric keys. The processor 210 may decrypt at least one encrypted backup data based on the decryption key. The processor 210 may perform data backup by using the decrypted at least one backup data.

According to an embodiment of the disclosure, the electronic device 200 may include the processor 210, the communication circuit 220 that establishes a connection between the external storage 240 and a device, and the memory 230 operatively connected to the processor 210 and storing instructions. When executed by the processor 210, the instructions may cause the electronic device 200 to execute an application that provides a backup function, to identify first data in response to a first user input to the application, to identify a backup history, which is associated with the first data and stored in the memory 230, to identify a data type of the first data in response to a fact that the at least one backup history is present, to generate all of the first data or a part of the first data, which is generated after a point in time according to a latest backup history, as backup data based on the data type, and to store the generated backup data in the external storage 240. According to an embodiment of the disclosure, when executed by the processor 210, the instructions may cause the electronic device 200 to generate all of the first data as backup data in response to a fact that the backup history is not present.

According to an embodiment of the disclosure, the data type may include a first data type and a second data type. The first data type may include at least one of a video file or an image file. The second data type may include at least one of a contact, a message history, or calendar information. According to an embodiment of the disclosure, when executed by the processor 210, the instructions may cause the electronic device 200 to generate the part of the first data, which is generated after a point in time according to the latest backup history, as backup data when a data type of the first data is the first data type, and to generate all of the first data as backup data when the data type of the first data is the second data type. For example, the external storage 240 may include magnetic storage (e.g., an external hard disk drive) and/or a flash memory device (e.g., a memory card, a memory stick, or a USB drive). According to an embodiment of the disclosure, the processor 210 may establish a connection between the external storage 240 and a device through a USB interface.

According to an embodiment of the disclosure, when executed by the processor 210, the instructions may cause the electronic device 200 to make a request for user authentication to at least one server in response to the first user input, to receive an encryption key from the at least one server 250 based on the user authentication result, and to encrypt the backup data based on the encryption key.

According to an embodiment of the disclosure, when executed by the processor 210, the instructions may cause the electronic device 200 to receive a second user input for data restoration to the application, to identify at least one of pieces of backup data stored in the external storage based on the second user input, and to decrypt the identified at least one backup data. The pieces of backup data may have different generation time points, respectively. According to an embodiment of the disclosure, the pieces of backup data stored in the external storage may be generated based on a user account linked to the electronic device.

According to an embodiment of the disclosure, when executed by the processor 210, the instructions may cause the electronic device 200 to make a request for user authentication to the at least one server 250 in response to the second user input, to receive a decryption key from the at least one server 250 based on the user authentication result, and to decrypt the identified at least one backup data based on the decryption key. The decryption key may correspond to the encryption key.

According to an embodiment of the disclosure, the electronic device may further include a display (e.g., the display module 160 of FIG. 1). When executed by the processor 210, the instructions may cause the electronic device 200 to display, through the display, a graphic object corresponding to the pieces of backup data stored in the external storage 240 together with at least one of a generation time of each of the pieces of backup data, information about a device generating the pieces of backup data, or a data capacity.

According to an embodiment of the disclosure, the electronic device 200 may include the processor 210, the communication circuit 220 that establishes a connection between the external storage 240 and a device, and the memory 230 operatively connected to the processor 210 and storing instructions. When executed by the processor 210, the instructions may cause the electronic device 200 to execute an application that provides a backup function, to identify first data in response to a first user input to the application, to identify a backup history, which is stored in the memory 230, to identify a data type of the first data in response to a fact that the at least one backup history is present, to generate all of the first data or a part of the first data, which is generated after a point in time according to a latest backup history, as backup data based on the data type, and to store the generated backup data in the external storage 240. For example, when executed by the processor 210, the instructions may cause the electronic device 200 to generate all of the first data as backup data in response to a fact that the backup history is not present.

According to an embodiment of the disclosure, the data type may include a first data type and a second data type. The first data type may include at least one of a video file or an image file. The second data type may include at least one of a contact, a message history, or calendar information. According to an embodiment of the disclosure, when executed by the processor 210, the instructions may cause the electronic device 200 to generate the part of the first data, which is generated after a point in time according to the latest backup history, as backup data when a data type of the first data is the first data type, and to generate all of the first data as backup data when the data type of the first data is the second data type.

According to an embodiment of the disclosure, the external storage 240 may include at least one of a solid state drive (SSD), a hard disk drive (HDD), or a universal serial bus (USB) drive.

According to an embodiment of the disclosure, when executed by the processor 210, the instructions may cause the electronic device 200 to make a request for user authentication to at least one server 250 in response to the first user input, to receive an encryption key from the at least one server 250 based on the user authentication result, and to encrypt the backup data based on the encryption key.

According to an embodiment of the disclosure, when executed by the processor 210, the instructions may cause the electronic device 200 to receive a second user input for data restoration to the application, to identify at least one of pieces of backup data stored in the external storage based on the second user input, and to decrypt the identified at least one backup data. The pieces of backup data may have different generation time points, respectively. According to an embodiment of the disclosure, the pieces of backup data stored in the external storage may be generated based on a user account linked to the electronic device.

According to an embodiment of the disclosure, when executed by the processor 210, the instructions may cause the electronic device 200 to make a request for user authentication to the at least one server 250 in response to the second user input, to receive a decryption key from the at least one server 250 based on the user authentication result, and to decrypt the identified at least one backup data based on the decryption key. The decryption key may correspond to the encryption key.

According to an embodiment of the disclosure, the electronic device may further include a display (e.g., the display module 160 of FIG. 1). When executed by the processor 210, the instructions may cause the electronic device 200 to display, through the display, a graphic object corresponding to the pieces of backup data stored in the external storage 240 together with at least one of a generation time of each of the pieces of backup data, information about a device generating the pieces of backup data, or a data capacity. The second user input may include a user input to a graphic object.

Figure 3A:
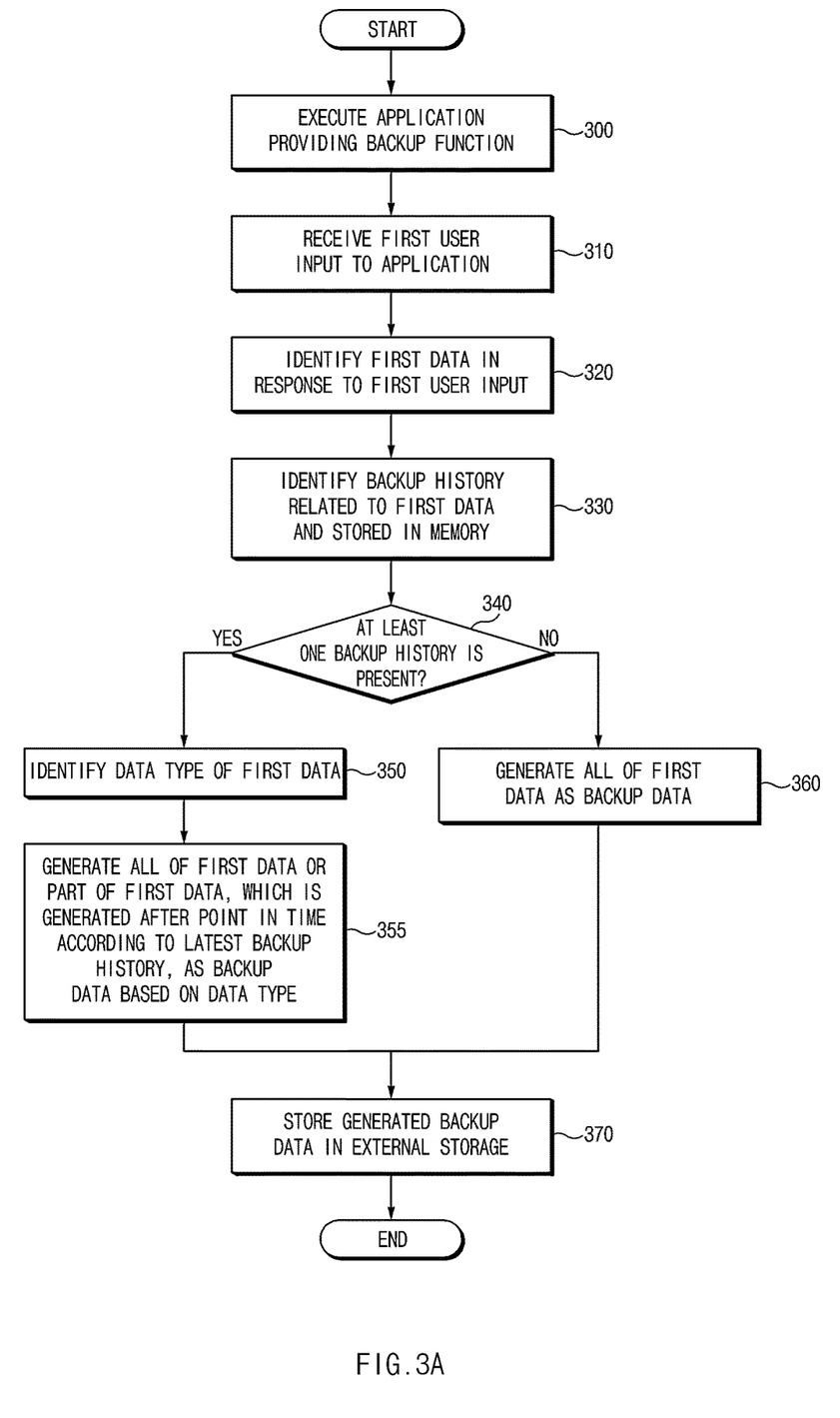
FIG. 3A is a flowchart illustrating generation and storage of backup data according to an embodiment of the disclosure.

FIG. 3A is a flowchart illustrating generation and storage of backup data according to an embodiment of the disclosure.

Referring to FIG. 3A, operation 300, a processor (e.g., the processor 210 in FIG. 2) may execute an application providing a backup function.

In operation 310, the processor 210 may receive a first user input to an application. For example, the first user input may be understood as a user's touch input to a display (e.g., the display module 160 of FIG. 1). Besides, the user input may include all the specified interactions (e.g., gestures or voice commands) to cause an electronic device (e.g., the electronic device 101 in FIG. 1 or the electronic device 200 in FIG. 2) to perform the specified operation. According to an embodiment of the disclosure, the first user input may include at least one user input for performing operations of FIG. 3A.

In operation 320, the processor 210 may identify first data in response to the first user input. The first data may be understood as data to be backed up.

In operation 330, the processor 210 may identify a backup history stored in a memory (e.g., the memory 230 of FIG. 2). The backup history may include information related to the backup performed before operation 310. According to an embodiment of the disclosure, the backup history of operation 330 may include information related to the backup performed based on a user account linked to the electronic device 200.

In operation 340, the processor 210 may determine whether at least one backup history is present, based on the backup history.

When the at least one backup history is present (operation 340—YES), the processor 210 may proceed to operation 350. In operation 350, the processor 210 may identify the data type of first data. According to an embodiment of the disclosure, the first data may correspond to a first data type or a second data type. Alternatively, some of the first data may correspond to the first data type, and the others thereof may correspond to the second data type.

According to an embodiment of the disclosure, the first data type may include at least one of a photo, music, a video, a document, a voice record, a lyric, a certificate, or a playlist. The second data type may include at least one of a contact, a calendar, a text, a memo, APK, a homescreen setting (e.g., a layout, a wallpaper, or a setting value), a Wi-Fi setting, a Bluetooth setting, a keyboard setting, an accessibility setting, a font setting, a camera setting, an AOD setting, an edge panel setting, and a notification setting. According to an embodiment of the disclosure, the first data type may be understood as a data type that generally has a larger data capacity than the second data type.

In operation 355, the processor 210 may generate all of the first data or a part of the first data, which is generated after a point in time according to the latest backup history, as backup data based on the data type of the first data.

According to an embodiment of the disclosure, when the data type of the first data is the first data type, the processor 210 may perform a differential backup on the first data. In other words, the processor 210 may generate a part of the first data, which is generated after a point in time according to the latest backup history as backup data. Through the differential backup, the processor 210 may reduce the amount of redundant data between pieces of backup data. The processor 210 may efficiently manage the storage space of the external storage 240 by reducing the total data capacity of accumulated backup data.

According to an embodiment of the disclosure, when the data type of the first data is the second data type, the processor 210 may perform a full backup on the first data. In other words, the processor 210 may generate all of the first data as backup data. Data of the second data type may have a data capacity smaller than data of the first data type. Accordingly, the possibility of causing the external storage 240 to run out of storage space due to the accumulated backup data may be low. Accordingly, the processor 210 may generate all of the first data of the second data type as backup data regardless of the backup history.

When the part of the first data corresponds to the first data type and the other(s) thereof corresponds to the second data type, the processor 210 may perform an operation according to operation 355 depending on each data type. For example, the processor 210 may perform a differential backup on a part of the first data corresponding to the first data type, and may perform a full backup on a part of the first data corresponding to the second data type.

When there is no at least one backup history (operation 340—NO), the processor 210 may proceed to operation 360. In operation 360, the processor 210 may generate all of the first data as backup data. According to an embodiment of the disclosure, the backup data generated in operation 360 may be the first backup data generated based on a user account linked to the electronic device 200.

In operation 370, the processor 210 may store the backup data, which is generated in operation 355 or operation 360, in the external storage 240. For example, the external storage 240 may include magnetic storage (e.g., an external hard disk drive) and/or a flash memory device (e.g., a memory card, a memory stick, or a USB drive). According to an embodiment of the disclosure, the processor 210 may establish a connection between the external storage 240 and a device through a USB interface. For another example, the external storage 240 may be a memory included in the at least one server 250.

According to an embodiment of the disclosure, a method of operating the electronic device 200 may include executing an application that provides a backup function, identifying first data in response to a first user input to the application, identifying a backup history associated with first data, identifying a data type of the first data in response to a fact that the at least one backup history is present, generating all of the first data or a part of the first data, which is generated after a point in time according to a latest backup history, as backup data based on the data type, and storing the generated backup data in external storage. According to an embodiment of the disclosure, the method of the electronic device 200 may further include generating all of the first data as backup data in response to a fact that the backup history is not present.

According to an embodiment of the disclosure, the data type may include a first data type and a second data type. The first data type may include at least one of a video file or an image file. The second data type may include at least one of a contact, a message history, or calendar information.

According to an embodiment of the disclosure, the method of the electronic device 200 may further include generating the part of the first data, which is generated after a point in time according to the latest backup history, as backup data when a data type of the first data is the first data type, and generating all of the first data as backup data when the data type of the first data is the second data type.

According to an embodiment of the disclosure, the external storage 240 may include at least one of a solid state drive (SSD), a hard disk drive (HDD), or a universal serial bus (USB) drive.

Figure 3B:
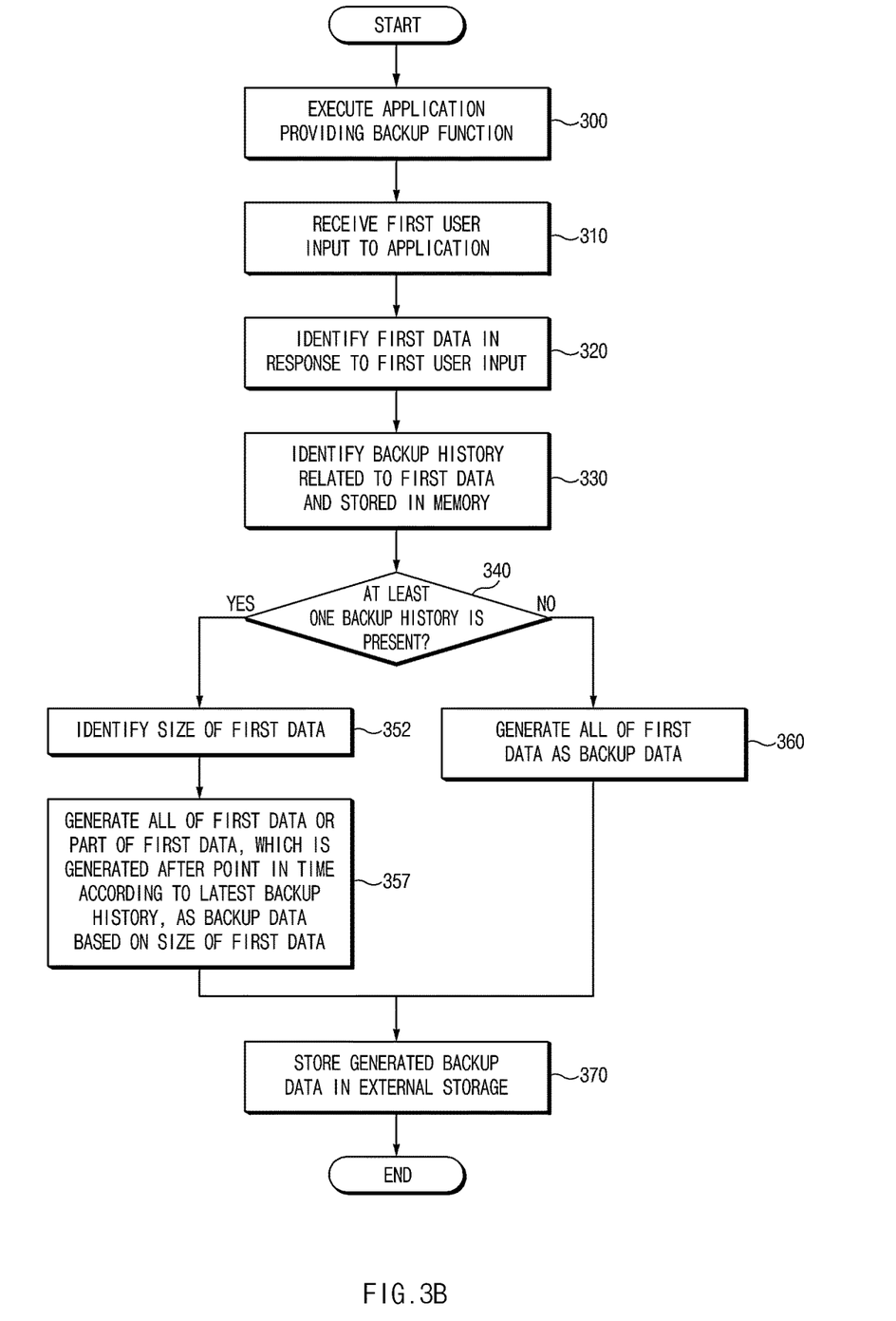
FIG. 3B is a flowchart illustrating generation and storage of backup data according to an embodiment of the disclosure.

FIG. 3B is a flowchart illustrating generation and storage of backup data according to an embodiment of the disclosure.

Referring to FIG. 3B, the same reference numerals among reference numerals of FIG. 3B as those of FIG. 3A may be referenced by the description of FIG. 3A. Hereinafter, differences between FIGS. 3B and 3A will be mainly described.

In operation 352, the processor 210 may identify the size of first data. According to an embodiment of the disclosure, the processor 210 may identify the size of the entire first data. According to an embodiment of the disclosure, the processor 210 may identify a data type of the first data. When first data includes data based on a plurality of data types, the processor 210 may identify the size of data according to each data type. A description of a data type may be referenced by the description of the data type of FIG. 3A.

In operation 357, the processor 210 may generate all of the first data or a part of the first data, which is generated after a point in time according to the latest backup history, as backup data based on the size of the first data. According to an embodiment of the disclosure, the processor 210 may determine whether to perform a full backup or a differential backup, by comparing the size of first data with a threshold value. The threshold value may be set to a value that allows the storage space occupied by backup data in the external storage 240 to be less than or equal to a specific level.

According to an embodiment of the disclosure, when the size of the first data is not less than the threshold value, the processor 210 may perform the differential backup. When the size of the first data is less than the threshold value, the processor 210 may perform the full backup. For example, when the size of the entire first data is less than the threshold value, the processor 210 may efficiently manage the storage space of the external storage 240 by performing a full backup regardless of the data type. For another example, the processor 210 may differently set threshold values for first data type-based data and second data type-based data. The processor 210 may determine each backup method by comparing the size of the first data type-based data with a first threshold value and comparing the size of the second data type-based data with a second threshold value.

According to another embodiment of the disclosure, the processor 210 may identify data types of data included in the first data. In some cases, the second data type of data may occupy storage space larger than the first data type of data. For example, when a memo (e.g., the second data type of data) having attached images and/or videos (e.g., the first data type of data) is backed up, the size of memo data may be larger than the size of the first data type-based data. According to an embodiment of the disclosure, the processor 210 may set different threshold values depending on the relative ratio of data based on the first data type and data based on the second data type. For example, the processor 210 may determine a threshold value for the second data type by comparing the size of the second data type-based data included in the first data with the size of the first data type-based data. The processor 210 may determine a backup method by comparing the size of the second data type-based data with a threshold value. In this case, the processor 210 may perform a differential backup on the first data type-based data. Alternatively, the processor 210 may determine a backup method by comparing the first data type-based data with a threshold value (e.g., the same as or different from the threshold value for the second data type-based data).

Figure 4:
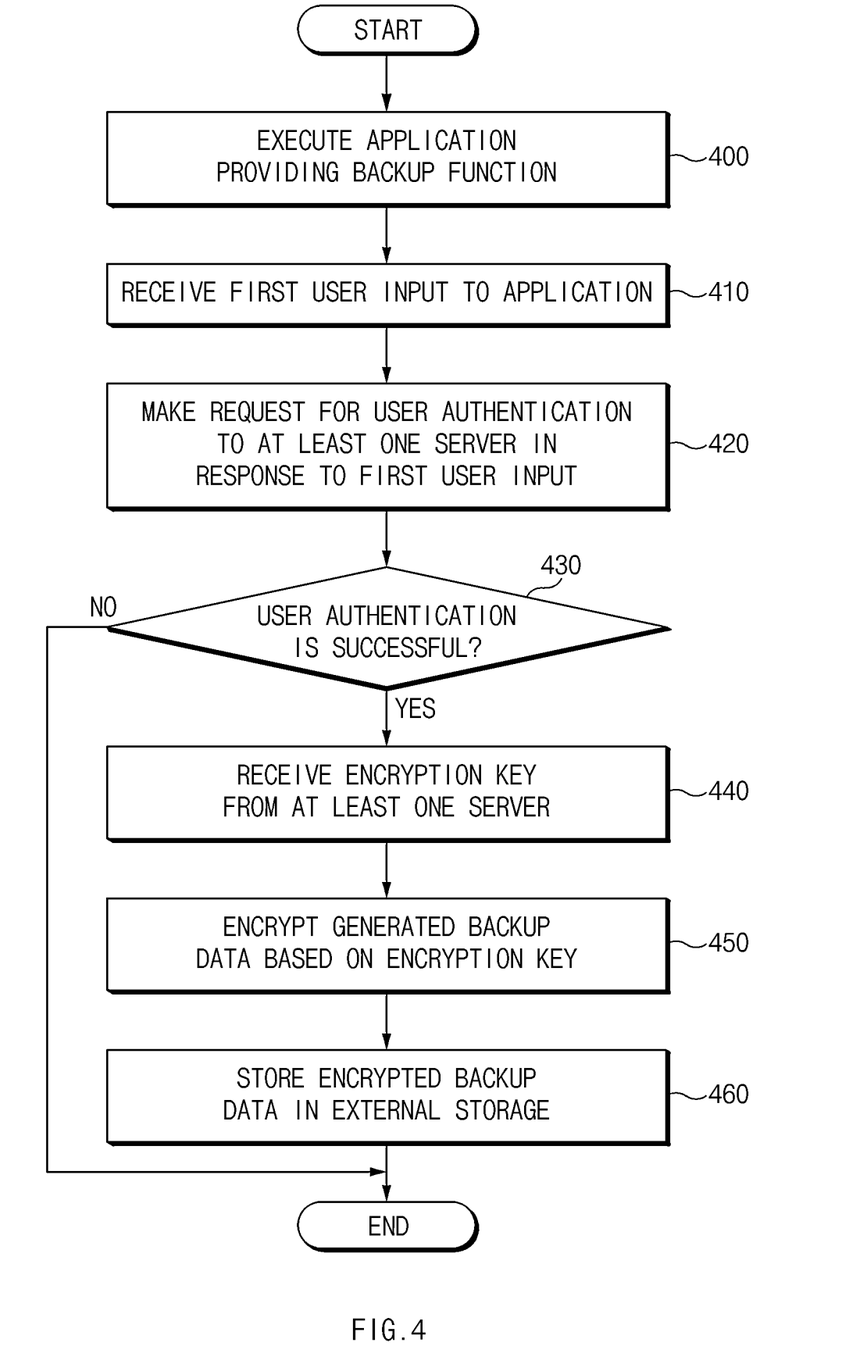
FIG. 4 is a flowchart illustrating an encryption operation of backup data according to an embodiment of the disclosure.

FIG. 4 is a flowchart illustrating an encryption operation of backup data according to an embodiment of the disclosure.

Referring to FIG. 4, operations of the electronic device (e.g., the electronic device 200 of FIG. 2) of FIG. 4 are obtained by adding a security operation to the operations of the electronic device 200 of FIG. 3A. Operation 400 and operation 410 of FIG. 4 may correspond to operation 300 and operation 310 of FIG. 3A, respectively.

In operation 400, the processor 210 may execute an application providing a backup function.

In operation 410, the processor 210 may receive a first user input to an application.

In operation 420, the processor 210 may make a request for user authentication to at least one server (e.g., the at least one server 250 of FIG. 2) in response to a first user input. The at least one server 250 may perform user authentication based on a user account in response to a user authentication request.

According to an embodiment of the disclosure, in operation 430, the processor 210 may determine whether user authentication is successful. For example, the user authentication of the at least one server 250 may require a user to enter an identifier (ID) and password. The at least one server 250 may determine whether the user of the electronic device 200 is a user registered in the at least one server 250, based on the ID and password that are entered by the user. For another example, the user authentication of the at least one server 250 may make a request for biometric information (e.g., a fingerprint or an iris) to the user. The at least one server 250 may determine whether the user of the electronic device 200 is a user registered in the at least one server 250, by comparing biometric information of the user with biometric information stored in the at least one server 250. When the user of the electronic device 200 matches user information registered in the at least one server 250, the at least one server 250 may determine that user authentication of the electronic device 200 is successful.

When the at least one server 250 fails to the user authentication (operation 430—NO), the processor 210 may terminate the operation.

When the at least one server 250 succeeds in the user authentication (operation 430—YES), the processor 210 may proceed to operation 440.

In operation 440, the processor 210 may receive an encryption key from the at least one server 250. According to an embodiment of the disclosure, the encryption key of operation 440 may be understood as an account key generated based on the user's account. According to an embodiment of the disclosure, the at least one server 250 may assign different unique values to users registered in the at least one server 250. The account key may be generated based on a unique value assigned to a user of the electronic device 200.

In operation 450, the processor 210 may encrypt the generated backup data based on the encryption key. A description of the generation of backup data may be referenced by the description of FIG. 3A. The backup data of operation 450 may correspond to the backup data generated in operation 355 or operation 360 of FIG. 3A.

In operation 460, the processor 210 may store the encrypted backup data in an external storage (e.g., the external storage 240 of FIG. 2). Operation 460 may correspond to operation 370 of FIG. 3A.

Figure 5:
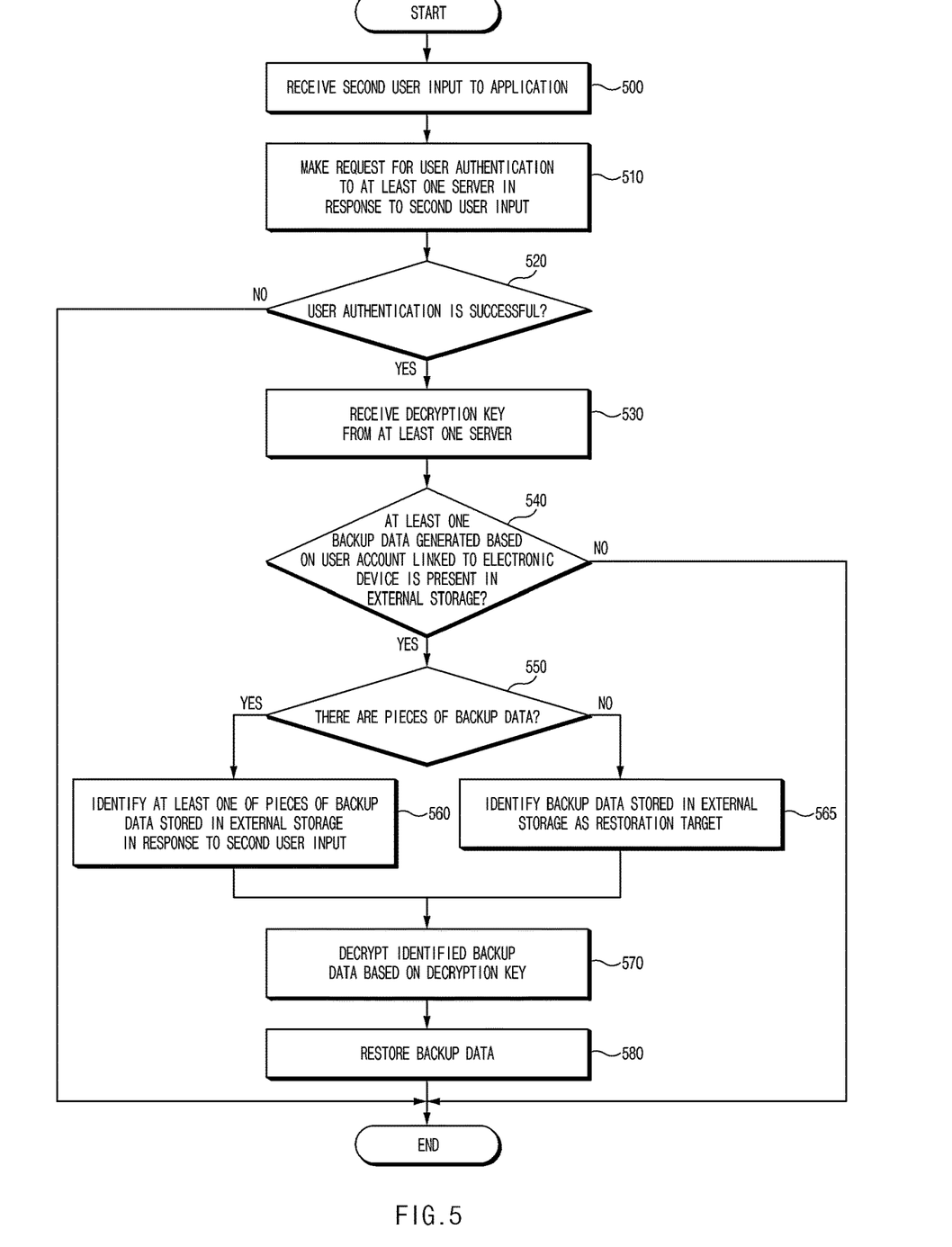
FIG. 5 is a flowchart illustrating data restoration according to an embodiment of the disclosure.

FIG. 5 is a flowchart illustrating data restoration according to an embodiment of the disclosure.

Referring to FIG. 5, in operation 500, a processor (e.g., the processor 210 of FIG. 2) may receive a second user input to an application. The second user input may include at least one user input for performing operations of FIG. 5.

In operation 510, the processor 210 may make a request for user authentication to at least one server (e.g., the at least one server 250) in response to a second user input. The user authentication in operation 510 may be user authentication based on a user account. The user authentication of operation 510 may correspond to the user authentication of operation 420 of FIG. 4.

In operation 520, the processor 210 may determine whether user authentication is successful. When the at least one server 250 fails to the user authentication (operation 520—NO), the processor 210 may terminate the operation.

When the at least one server 250 succeeds in the user authentication (operation 520—YES), the processor 210 may proceed to operation 530. In operation 530, the processor 210 may receive a decryption key from the at least one server 250. According to an embodiment of the disclosure, the decryption key may be generated based on a unique value assigned to a user account. According to an embodiment of the disclosure, the decryption key may be the same as the encryption key of FIG. 4. In this case, the decryption key and encryption key may be symmetric keys.

In operation 540, the processor 210 may identify whether at least one backup data generated based on a user account linked to the electronic device 200 is present in the external storage 240.

When at least one backup data generated based on the user account linked to the electronic device 200 is present in the external storage 240 (operation 540—YES), the processor 210 may proceed to operation 550.

According to an embodiment of the disclosure, when there is no backup data stored in the external storage 240 (operation 540—NO), the processor 210 may terminate the operation. Alternatively, when the backup data stored in the external storage 240 is generated based on a user account of a user different from the user of the electronic device 200 (operation 540—NO), the processor 210 may terminate the operation.

In operation 550, the processor 210 may determine whether there are pieces of backup data stored in the external storage 240. The backup data generated in operation 550 may be backup data generated based on a user account linked to the electronic device 200.

When there are pieces of backup data (operation 550—YES), the processor 210 may proceed to operation 560. In operation 560, the processor 210 may identify at least one of the pieces of backup data stored in the external storage 240 in response to the second user input. According to an embodiment of the disclosure, a user may desire to restore only backup data at a specified point in time among pieces of backup data stored in the external storage 240. The user may assign backup data at a desired point in time as the restoration target by entering the second user input.

When there is only one backup data (operation 550—NO), the processor 210 may proceed to operation 565. In operation 565, the processor 210 may identify backup data stored in the external storage 240 as a restoration target. In this case, because there is only one backup data stored in the external storage 240, the processor 210 may identify the stored backup data as the restoration target in response to the second user input, or may not perform data restoration.

In operation 570, the processor 210 may decrypt the identified backup data based on the decryption key. The decryption key of operation 570 may be the decryption key received in operation 530. When the decryption key matches the encryption key obtained by encrypting the backup data, operation 570 may be successfully performed. When the decryption key does not match the encryption key obtained by encrypting the backup data, the processor 210 may fail to decrypt the identified backup data. In this case, the processor 210 may terminate the operation.

In operation 580, the processor 210 may restore the decrypted backup data. The processor 210 may store the restored data in a memory (e.g., the memory 230 of FIG. 2) of the electronic device 200.

Figure 6:
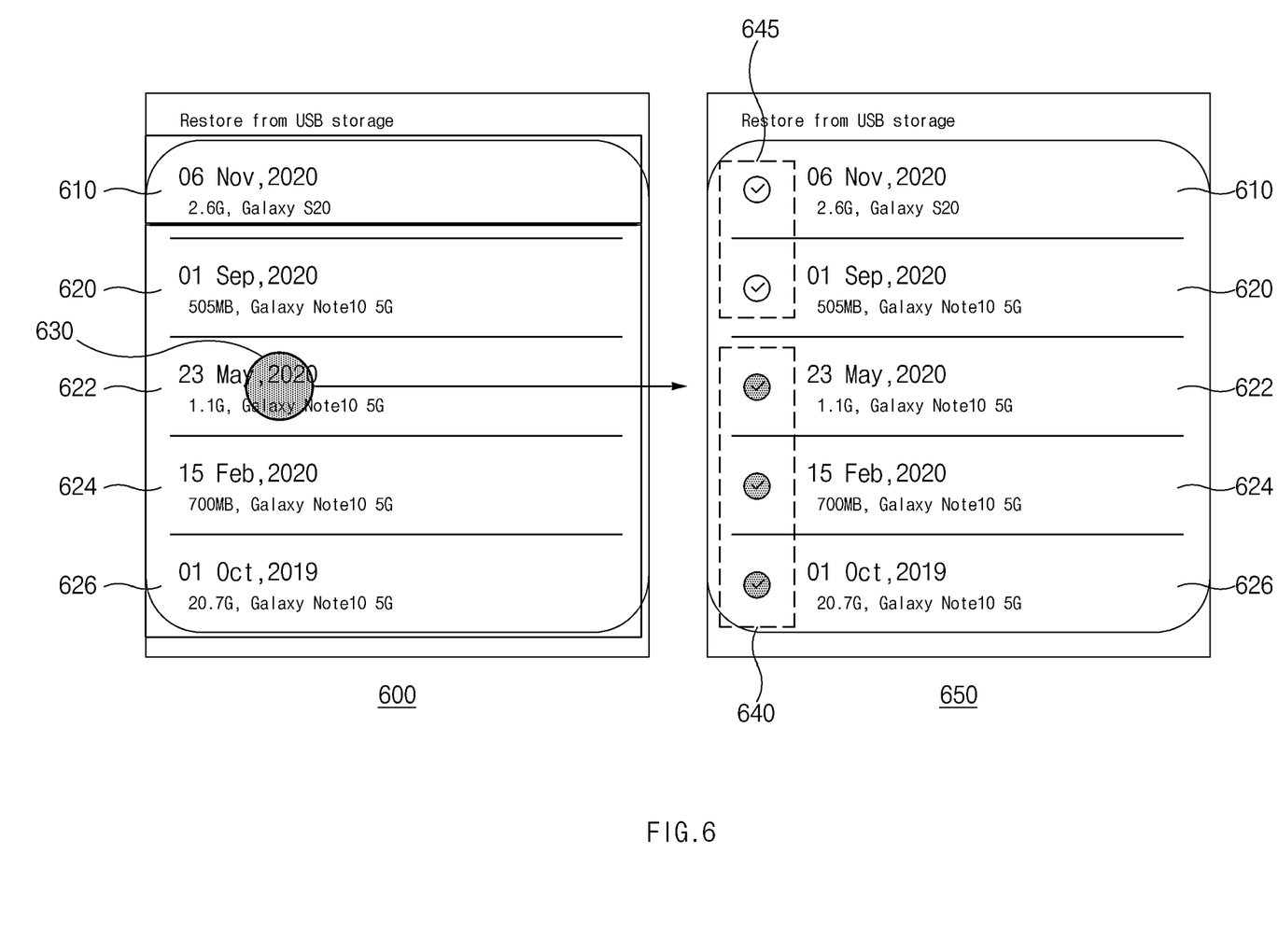
FIG. 6 illustrates an application screen for data restoration according to an embodiment of the disclosure.

FIG. 6 illustrates an application screen for data restoration according to an embodiment of the disclosure.

Referring to FIG. 6, according to an embodiment of the disclosure, a processor (e.g., the processor 210 of FIG. 2) may display a screen 600 and a screen 650 through a display (e.g., the display module 160 of FIG. 1). Based on a user input (e.g., the second user input in FIG. 6) to the screen 600, the processor 210 may select backup data to be restored.

Referring to FIG. 6, the screen 600, the processor 210 may display, through the display, graphic objects 610, 620, 622, 624, and 626 corresponding to pieces of backup data. The processor 210 may display, through the graphic objects 610, 620, 622, 624, and 626, information about a generation time of backup data corresponding to each of the graphic objects 610, 620, 622, 624, and 626, a device (or a user account) that has generated the backup data, and/or the capacity of the backup data.

According to an embodiment of the disclosure, backup data corresponding to the graphic object 610 has been generated by Galaxy S20 (e.g., a device name) on Nov. 6, 2020, and the data capacity thereof may be about 2.6 G. It may be understood that the backup data corresponding to the graphic object 610 and backup data corresponding to each of the graphic objects 620, 622, 624, and 626 are generated by different electronic devices. In this case, it may be understood that the backup data corresponding to the graphic object 610 and the backup data corresponding to each of the graphic objects 620, 622, 624, and 626 are generated based on different user accounts.

According to an embodiment of the disclosure, a user account linked to the Galaxy S20 may be different from a user account linked to the Galaxy Note10 5G. When the electronic device 200 is a Galaxy Note10 5G, the processor 210 may not perform data restoration by using backup data (e.g., corresponding to the graphic object 610) generated based on the user account of the Galaxy S20. In this case, the processor 210 may perform data restoration by using at least one of backup data (e.g., corresponding to the graphic objects 620, 622, 624, and 626) generated based on the user account of the Galaxy Note10 5G.

According to an embodiment of the disclosure, the processor 210 may receive a user input 630 (e.g., the second user input in FIG. 4) to at least one of the graphic objects 620, 622, 624, and 626. FIG. 6 illustrates that the user input 630 is a touch input to the graphic object 622. However, for example, the user input 630 may be a drag input for selecting all of the graphic objects 622, 624, and 626. For another example, the user input 630 may include a plurality of touch inputs for respectively selecting at least one of the graphic objects 620, 622, 624, and 626.

According to an embodiment of the disclosure, when the user input 630 to the graphic object 622 is received, the processor 210 may identify that all backup data generated before backup data corresponding to the graphic object 622 is selected in addition to the backup data corresponding to the graphic object 622. Referring to the screen 650, the processor 210 may display a plurality of icons 640 in conjunction with the graphic objects 622, 624, and 626 to indicate that the graphic objects 622, 624, and 626 have been selected as restoration targets based on the user input 630. The processor 210 may display a plurality of icons 645 in conjunction with the graphic objects 610 and 620 that are not selected as restoration targets.

According to an embodiment of the disclosure, the processor 210 may perform data restoration by using backup data corresponding to the graphic objects 622, 624, and 626 selected on the screen 650.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
at least one processor;
a communication circuit configured to establish a connection between external storage and a device; and
memory operatively connected to the at least one processor and configured to store instructions,
wherein the instructions, when executed by the at least one processor, cause the electronic device to:
execute an application that provides a backup function,
identify first data in response to a first user input to the application,
identify a size of the first data,
generate all of the first data as a backup data or a part of the first data, which is generated after a point in time according to a latest backup history, as the backup data based on a comparison of the identified size of the first data and a threshold value, and
store the backup data in the external storage,
wherein the first data includes a first data type stored in a first data format and a second data type stored in a second data format, the first data format and the second data format associated with different applications, and
wherein the threshold value includes a first threshold value corresponding to the first data type and a second threshold value corresponding to the second data type,
wherein the instructions, when executed by the at least one processor, further cause the electronic device to:
in response to identifying the first data of the first data type, compare the identified size of the first data and the first threshold value, and
in response to identifying the first data of the second data type, compare the identified size of the first data and the second threshold value.

2. The electronic device of claim 1, wherein the instructions, when executed by the at least one processor, cause the electronic device to:
generate all of the first data as the backup data when the size of the first data is less than the threshold value.

3. The electronic device of claim 1, wherein the first data type includes at least one of a video file or an image file, and wherein the second data type includes at least one of a contact, a message history, or calendar information.

4. The electronic device of claim 1, wherein the external storage includes at least one of a solid state drive (SSD), a hard disk drive (HDD), or a universal serial bus (USB) drive.

5. The electronic device of claim 1, wherein the instructions, when executed by the at least one processor, further cause the electronic device to:
make a request for user authentication to at least one server in response to the first user input;
receive an encryption key from the at least one server based on a user authentication result; and
encrypt the backup data based on the encryption key.

6. The electronic device of claim 5,
wherein the instructions, when executed by the at least one processor, further cause the electronic device to:
receive a second user input for data restoration to the application, identify at least one of pieces of the backup data stored in the external storage based on the second user input, and decrypt the identified at least one of pieces of the backup data, and wherein the pieces of the backup data have different generation time points, respectively.

7. The electronic device of claim 6, wherein the pieces of the backup data stored in the external storage are generated based on a user account linked to the electronic device.

8. The electronic device of claim 7, wherein the instructions, when executed by the at least one processor, further cause the electronic device to:

make a request for user authentication to the at least one server in response to the second user input, receive a decryption key from the at least one server based on the user authentication result, and decrypt the identified at least one of the pieces of the backup data based on the decryption key, and wherein the decryption key corresponds to the encryption key.

9. The electronic device of claim 1, further comprising: a display, wherein the instructions, when executed by the at least one processor, further cause the electronic device to:

display, through the display, a graphic object corresponding to pieces of the backup data stored in the external storage together with at least one of a generation time of each of the pieces of the backup data, information about a device generating the pieces of the backup data, or a data capacity, and wherein a second user input includes a user input to the graphic object.

10. A method of operating an electronic device, the method comprising:

executing an application that provides a backup function;

identifying first data in response to a first user input to the application;

identifying a size of the first data;

generating all of the first data as a backup data or a part of the first data which is generated after a point in time according to a latest backup history, as the backup data based on a comparison of the identified size of the first data and a threshold value; and storing the backup data in external storage, wherein the first data includes a first data type stored in a first data format and a second data type stored in a second data format, the first data format and the second data format associated with different applications, and wherein the threshold value includes a first threshold value corresponding to the first data type and a second threshold value corresponding to the second data type, wherein the generating of the backup data comprises:

in response to identifying the first data of the first data type, comparing the identified size of the first data and the first threshold value, and in response to identifying the first data of the second data type, comparing the identified size of the first data and the second threshold value.

11. The method of claim 10, further comprising:

generating all of the first data as the backup data when the size of the first data is less than the threshold value.

12. The method of claim 10, wherein the first data type includes at least one of a video file or an image file, and wherein the second data type includes at least one of a contact, a message history, or calendar information.

13. The method of claim 10, wherein the external storage includes at least one of a solid state drive (SSD), a hard disk drive (HDD), or a universal serial bus (USB) drive.

14. The method of claim 10, further comprising:

making a request for user authentication to at least one server in response to the first user input;

receiving an encryption key from the at least one server based on a user authentication result; and encrypting the backup data based on the encryption key.

15. The method of claim 14, further comprising:

receiving a second user input for data restoration to the application;

identifying at least one of pieces of the backup data stored in the external storage based on the second user input; and decrypting the identified at least one of the pieces of the backup data, wherein the pieces of the backup data have different generation time points, respectively.

16. The method of claim 15, wherein the pieces of the backup data are generated based on a user account linked to the electronic device.

17. The method of claim 16, further comprising:

making a request for user authentication to the at least one server in response to the second user input;

receiving a decryption key from the at least one server based on a user authentication result; and decrypting the identified at least one of the pieces of the backup data based on the decryption key, wherein the decryption key corresponds to the encryption key.

18. The method of claim 10, further comprising:

displaying, through a display, a graphic object corresponding to pieces of the backup data together with at least one of a generation time of each of the pieces of the backup data, information about a device generating the pieces of the backup data, or a data capacity, wherein a second user input includes a user input to the graphic object.

19. The electronic device of claim 1, wherein the first data format has a first specified file extension name and the second data format has a second specified file extension name, the first specified file extension name being different from the second specified file extension name.

* * * * *